United States Patent
Matsushima et al.

(10) Patent No.: US 11,809,036 B2
(45) Date of Patent: Nov. 7, 2023

(54) DISPLAY DEVICE, VIEWING ANGLE CONTROL DEVICE, ELECTRONIC DISPLAY DEVICE, AND MULTIPLE IMAGE DISPLAY DEVICE HAVING A VIEWING ANGLE CONTROL PANEL WITH A TRANSPARENT ELECTRODE AND ALIGNMENT FILM

(71) Applicant: Japan Display Inc., Tokyo (JP)

(72) Inventors: Toshiharu Matsushima, Tokyo (JP); Shunichi Kimura, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/847,432

(22) Filed: Jun. 23, 2022

(65) Prior Publication Data
US 2022/0413338 A1    Dec. 29, 2022

(30) Foreign Application Priority Data
Jun. 23, 2021 (JP) .................. 2021-104319

(51) Int. Cl.
*G02F 1/1335* (2006.01)
*G02F 1/1337* (2006.01)
*G02F 1/137* (2006.01)
*G02F 1/13* (2006.01)

(52) U.S. Cl.
CPC ...... *G02F 1/133531* (2021.01); *G02F 1/1323* (2013.01); *G02F 1/1337* (2013.01); *G02F 1/13787* (2021.01); *G02F 1/133528* (2013.01); *G02F 1/133757* (2021.01); *G02F 1/133773* (2021.01); *G02F 2413/105* (2013.01)

(58) Field of Classification Search
CPC .......... G02F 1/13787; G02F 2413/105; G02F 1/133531; G02F 1/133528
See application file for complete search history.

(56) References Cited

U.S. PATENT DOCUMENTS

| | | | |
|---|---|---|---|
| 2005/0190329 A1 | 9/2005 | Okumura | |
| 2007/0146578 A1* | 6/2007 | Yabuta | G02F 1/1347 349/96 |
| 2008/0117364 A1* | 5/2008 | Matsushima | G02F 1/1323 349/96 |

FOREIGN PATENT DOCUMENTS

| | | | |
|---|---|---|---|
| JP | 2005-275342 A | 10/2005 | |
| JP | 2006-330164 | * 12/2006 | G02F 1/1347 |

\* cited by examiner

*Primary Examiner* — Lauren Nguyen
(74) *Attorney, Agent, or Firm* — XSENSUS LLP

(57) ABSTRACT

According to one embodiment, an electronic device includes a first polarizer having a first transmission axis, a first viewing angle control panel including a first liquid crystal layer containing hybrid-aligned liquid crystal molecules, a second polarizer, a second viewing angle control panel including a second liquid crystal layer containing hybrid-aligned liquid crystal molecules and a third polarizer. In plan view, an initial alignment direction of horizontally aligned liquid crystal molecules of the first liquid crystal layer and an initial alignment direction of horizontally aligned liquid crystal molecules of the second liquid crystal layer are parallel to each other and parallel or orthogonal to the first transmission axis.

2 Claims, 14 Drawing Sheets

DISPLAY DEVICE, VIEWING ANGLE CONTROL DEVICE, ELECTRONIC DISPLAY DEVICE, AND MULTIPLE IMAGE DISPLAY DEVICE HAVING A VIEWING ANGLE CONTROL PANEL WITH A TRANSPARENT ELECTRODE AND ALIGNMENT FILM

CROSS-REFERENCE TO RELATED APPLICATIONS

This application is based upon and claims the benefit of priority from Japanese Patent Application No. 2021-104319 filed on Jun. 23, 2021, the entire contents of which are incorporated herein by reference.

FIELD

Embodiments described herein relate generally to an electronic device.

BACKGROUND

In recent years, there has been a demand for display devices to be able to vary the viewing angle to obtain a predetermined contrast ratio. For example, in display devices installed in vehicles such as automobiles, viewing angle control is required by which displayed images are visible from a passenger side but invisible from a driver's seat side during, for example, the driver is driving.

For the application of such a viewing angle control, technologies using a liquid crystal element containing hybrid-aligned liquid crystal molecules have been proposed.

BRIEF DESCRIPTION OF THE DRAWINGS

FIG. 8A is a diagram for illustrating viewing angle characteristics of an electronic device 100 when it is off and on.

DETAILED DESCRIPTION

Figure 1:
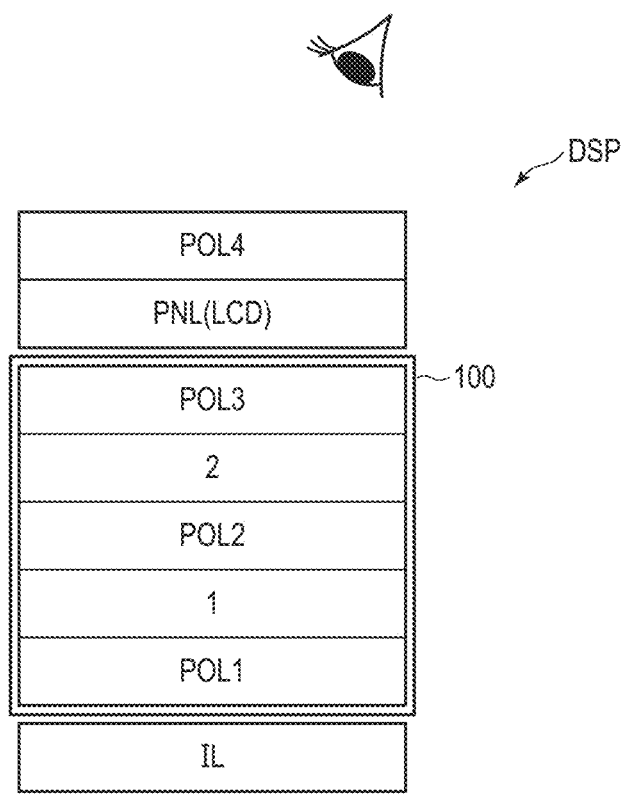
FIG. 1 is a diagram showing a configuration example of a display device DSP according to an embodiment.

In general, according to an embodiment, an electronic device comprises a first polarizer having a first transmission axis, a first viewing angle control panel provided on an front surface side of the first polarizer and comprising a first liquid crystal layer containing hybrid-aligned liquid crystal molecules, a second polarizer provided on a front surface side of the first viewing angle control panel and having a second transmission axis parallel to the first transmission axis, a second viewing angle control panel provided on a front surface side of the second polarizer and comprising a second liquid crystal layer containing hybrid-aligned liquid crystal molecules and a third polarizer provided on a front surface side of the second viewing angle control panel and having a third transmission axis parallel to the first transmission axis. In plan view, a first initial alignment direction of those horizontally aligned first liquid crystal molecules of the liquid crystal molecules of the first liquid crystal layer and a second initial alignment direction of those horizontally aligned second liquid crystal molecules of the liquid crystal molecules of the second liquid crystal layer are parallel to each other and parallel or orthogonal to the first transmission axis.

According to another embodiment, an electronic device comprises a first polarizer having a first transmission axis, a first viewing angle control panel provided on an front surface side of the first polarizer and comprising a first liquid crystal layer containing hybrid-aligned liquid crystal molecules, a second viewing angle control panel provided on an front surface side of the first viewing angle control panel and comprising a second liquid crystal layer containing hybrid-aligned liquid crystal molecules and a third polarizer provided on a front surface side of the second viewing angle control panel and having a third transmission axis parallel to the first transmission axis. In plan view, a first initial alignment direction of those horizontally aligned first liquid crystal molecules of the liquid crystal molecules of the first liquid crystal layer and a second initial alignment direction of those horizontally aligned second liquid crystal molecules of the liquid crystal molecules of the second liquid crystal layer are orthogonal to each other, and one of the first initial alignment direction and the second initial alignment direction is orthogonal to the first transmission axis.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Configuration Example

FIG. 1 is a diagram showing a configuration example of a display device DSP of this embodiment.

The display device DSP comprises an electronic device 100, a display panel PNL and an illumination device IL. In the example shown in FIG. 1, the electronic device 100 is provided between the illumination device IL and the display panel PNL. The electronic device 100 comprises a first viewing angle control panel 1, a second viewing angle control panel 2, a first polarizer POL1, a second polarizer POL 2 and a third polarizer POL3.

The first polarizer POL1 is located on a front surface side of the illumination device IL (or on an observation position side where the display device DSP is observed). The first viewing angle control panel 1 is provided on a front surface side of the first polarizer POL1. The second polarizer POL2 is provided on a front surface side of the first viewing angle control panel 1. The second viewing angle control panel 2 is provided on a front surface side of the second polarizer POL2. The third polarizer POL3 is provided on a front surface side of the second viewing angle control panel 2. Details of the first viewing angle control panel 1 and the second viewing angle control panel 2 will be described later.

The display panel PNL is provided on a front surface side of the third polarizer POL3. The fourth polarizer POL4 is provided on a front surface side of the display panel PNL.

Figure 2:
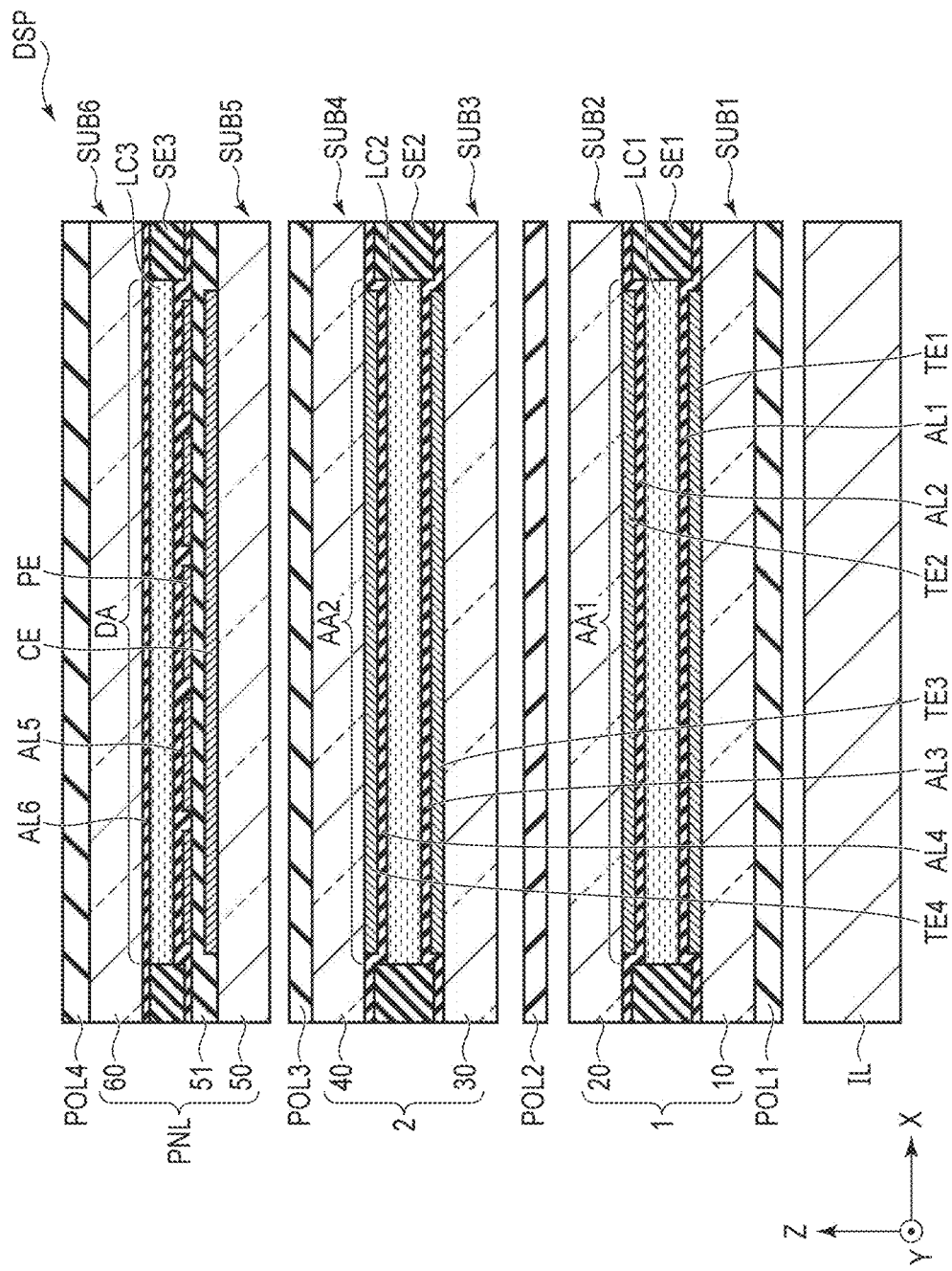
FIG. 2 is a cross-sectional view of a configuration example of the display device DSP shown in FIG. 1.

FIG. 2 is a cross-sectional view of a configuration example of the display device DSP shown in FIG. 1.

Here, a first direction X, a second direction Y and a third direction Z are orthogonal to each other, but they may intersect each other at an angle other than 90°. The first direction X and the second direction Y correspond to directions parallel to a substrate contained in the display device DSP, for example, and the third direction Z corresponds to the thickness direction of the display device DSP.

The first viewing angle control panel 1 is, for example, a liquid crystal panel, and comprises a first substrate SUB1, a second substrate SUB2 and a first liquid crystal layer LC1. The first liquid crystal layer LC1 is held between the first substrate SUB1 and the second substrate SUB2 and sealed by a sealant SE1. The first liquid crystal layer LC1 contains hybrid-aligned liquid crystal molecules, as will be described later.

The first substrate SUB1 comprises an insulating substrate 10, a first transparent electrode TE1 and a first alignment film AL1. The first transparent electrode TE1 is formed over substantially the entire area in an effective area AA1 for controlling the viewing angle and is provided between the insulating substrate 10 and the first alignment film AL1.

The second substrate SUB2 is located on a front surface side of the first substrate SUB1. The second substrate SUB2 comprises an insulating substrate 20, a second transparent electrode TE2 and a second alignment film AL2. The second transparent electrode TE2 is formed over substantially the entire effective area AA1, and is provided between the insulating substrate 20 and the second alignment film AL2.

The first alignment film AL1 and the second alignment film AL2 are in contact with the first liquid crystal layer LC1. One of the first alignment film AL1 and the second alignment film AL2 is a horizontal alignment film and the other is a vertical alignment film. A horizontal alignment film is an alignment film that has an alignment restriction force substantially parallel to an X-Y plane defined by the first direction X and the second direction Y. A vertical alignment film is an alignment film that has an alignment restriction force that is substantially perpendicular to the X-Y plane.

The first transparent electrode TE1 overlaps the second transparent electrode TE2 via the first liquid crystal layer LC1 in the third direction. The first transparent electrode TE1 and the second transparent electrode TE2 are controlled to apply voltage to the first liquid crystal layer LC1.

The second viewing angle control panel 2 is, for example, a liquid crystal panel, and comprises a third substrate SUB3, a fourth substrate SUB4 and a second liquid crystal layer LC2. The second liquid crystal layer LC2 is held between the third substrate SUB3 and the fourth substrate SUB4, and sealed by a sealant SE2. The second liquid crystal layer LC2 contains hybrid-aligned liquid crystal molecules, as will be described later.

The third substrate SUB3 comprises an insulating substrate 30, a third transparent electrode TE3, and a third alignment film AL3. The third transparent electrode TE3 is formed over substantially the entire area in the effective area AA2 for controlling the viewing angle and is provided between the insulating substrate 30 and the third alignment film AL3.

The fourth substrate SUB4 is located on a front surface side of the third substrate SUB3. The fourth substrate SUB4 comprises an insulating substrate 40, a fourth transparent electrode TE4 and a fourth alignment film AL4. The fourth transparent electrode TE4 is formed over substantially the entire area in the effective area AA2, and is provided between the insulating substrate 40 and the fourth alignment film AL4.

The third alignment film AL3 and the fourth alignment film AL4 are in contact with the second liquid crystal layer LC2. One of the third alignment film AL3 and the fourth alignment films AL4 is a horizontal alignment film and the other is a vertical alignment film. In the first configuration example, an alignment treatment direction of the horizontal alignment film in the second viewing angle control panel 2 is parallel to an alignment treatment direction of the horizontal alignment film in the first viewing angle control panel 1.

The third transparent electrode TE3 overlaps the fourth transparent electrode TE4 via the second liquid crystal layer LC2 in the third direction Z. The third transparent electrode TE3 and the fourth transparent electrode TE4 are controlled to apply voltage to the second liquid crystal layer LC2.

The first transparent electrode TE1, the second transparent electrode TE2, the third transparent electrode TE3 and the fourth transparent electrode TE4 are each a single sheet electrode, for example, but they may be electrodes divided into a plurality of pieces along at least one of the first direction X and the second direction Y.

The first viewing angle control panel 1 and the second viewing angle control panel 2 described above are not provided with a light-shielding layer or a color filter layer from the viewpoint of suppressing a decrease in transmittance.

The display panel PNL is, for example, a liquid crystal panel and comprises a fifth substrate SUB5, a sixth substrate SUB6 and a liquid crystal layer LC3. The liquid crystal layer LC3 is held between the fifth substrate SUB5 and the sixth substrate SUB6 and sealed by a sealant SE3. The display panel PNL described here is configured, as an example, to control the alignment state of liquid crystal molecules contained in the liquid crystal layer LC3 by an electric field along the main surface of the substrate. Note that the configuration of the display panel PNL of this embodiment is not limited to the example shown in the figure, but may be configured to control the alignment state of liquid crystal molecules by an electric field along the normal direction of the main surface of the substrate. Here, the main surface of the substrate is equivalent to the X-Y plane.

The fifth substrate SUB5 comprises an insulating substrate 50, an insulating film 51, a common electrode CE, a plurality of pixel electrodes PE and an alignment film AL5. The common electrode CE is provided between the insulating substrate 50 and the insulating film 51. The pixel electrodes PE are provided between the insulating film 51 and the alignment film AL5. In the display area DA where images are displayed, multiple pixel electrodes PE overlap one common electrode CE via the insulating film 51. The pixel electrodes PE and the common electrode CE are controlled to apply voltage to the liquid crystal layer LC3. Note that though only the main parts are simplified and illustrated here, the fifth substrate SUB5 further comprise a plurality of scanning lines, a plurality of signal lines, switching elements electrically connected to the pixel electrodes PE, respectively, various types of insulating films and the like.

The sixth substrate SUB6 is located on a front surface side of the fifth substrate SUB5. The sixth substrate SUB6 comprises an insulating substrate 60 and an alignment film AL6. Note that though only the main parts are simplified and illustrated here, the sixth substrate SUB6 may further comprises a light-shielding layer, a color filter layer, an overcoat layer, a spacer, a spacer and the like.

The alignment film AL5 and the alignment film AL6 are in contact with the liquid crystal layer LC3. In one example, the alignment film AL5 and the alignment film AL6 are both horizontal alignment films, but both may be vertical alignment films, or one may be a horizontal alignment film, whereas the other may be vertical alignment film.

Here, the relationship between the first viewing angle control panel 1, the second viewing angle control panel 2 and the display panel PNL will now be focused.

The first liquid crystal layer LC1, the second liquid crystal layer LC2, and the liquid crystal layer LC3 overlap each other in the third direction Z. The effective area AA1, the effective area AA2 and the display area DA overlap each other in the third direction Z. The common electrode CE, the pixel electrodes PE, the first transparent electrode TE1, the second transparent electrode TE2, the third transparent electrode TE3 and the fourth transparent electrode TE4 overlap each other in the third direction Z.

The insulating substrates 10, 20, 30, 40, 50 and 60 are, for example, transparent substrates such as of glass substrate, resin substrate or the like. Note that one or more of the six insulating substrates may be made of a material different from that of the other substrates. For example, the insulating substrates 10, 20, 30 and 40 may be resin substrates, whereas the insulating substrates 50 and 60 may be glass substrates.

The common electrode CE, the pixel electrodes PE, the first transparent electrode TE1, the second transparent electrode TE2, the third transparent electrode TE3 and the fourth transparent electrode TE4 are transparent electrodes each made of a transparent conductive material such as indium tin oxide (ITO), indium zinc oxide (IZO) or the like.

The first polarizer POL1 is adhered to the insulating substrate 10. The second polarizer POL2 is adhered to at least one of the insulating substrate 20 and the insulating substrate 30. The third polarizer POL3 is adhered to the insulating substrate 40. The fourth polarizer POL4 is adhered to the insulating substrate 60. The first to fourth polarizers POL1 to POL4 are each provided with adhesive on one side of the preformed film, but they may be formed directly on the surfaces of the insulating substrates, respectively.

In display device DSP of such a configuration as described above, illumination light (unpolarized light) emitted from the illumination device IL proceeds along the third direction Z, and after passing through the first viewing angle control panel 1 and the second viewing angle control panel 2 successively in this order, the light illuminates the display panel PNL.

More specifically, when the illumination light emitted from the illumination device IL is unpolarized, the first polarizer POL1 transmits part of the polarization components of the illumination light.

The first viewing angle control panel 1 modulates and transmits the polarization component having passed through the first polarizer POL1 in the first polarizer LC1. The second polarizer POL2 transmits the polarization component having passed through the first viewing angle control panel 1.

The second viewing angle control panel 2 modulates and transmits the polarization component having passed through the second polarizer POL2 in the second liquid crystal layer LC2. The third polarizer POL3 transmits the polarization component having passed through the second viewing angle control panel 2.

The display panel PNL is illuminated by the polarization component having passed through the third polarizer POL3, and the polarization component is modulated in the liquid crystal layer LC3. The fourth polarizer POL4 transmits at least part of the polarization component having passed through the display panel PNL.

Note that the polarization component described here is linearly polarized light having a polarization axis in the X-Y plane.

Figure 3:
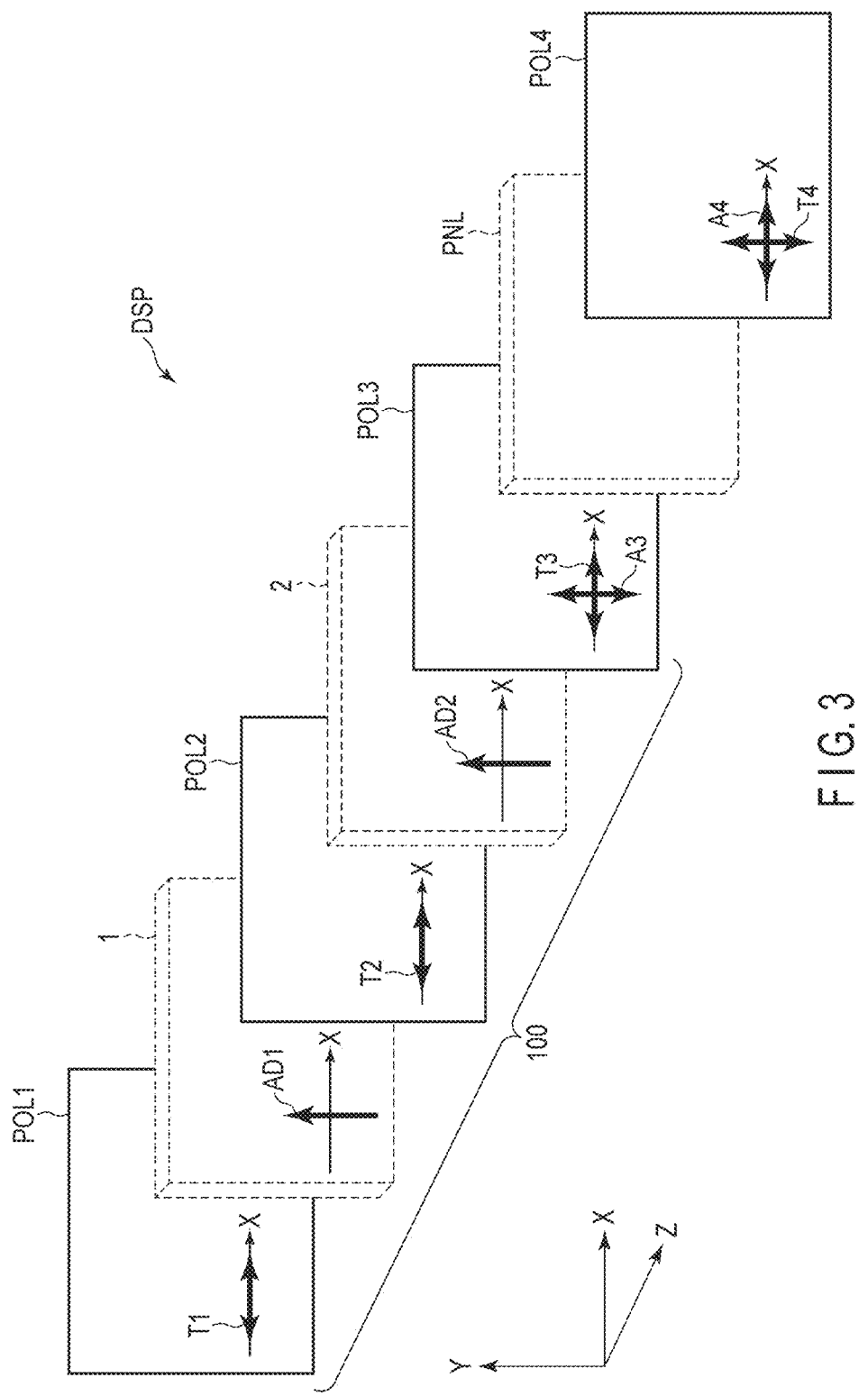
FIG. 3 is a diagram for illustrating an axial angle of each optical element constituting the display device DSP shown in FIG. 1.

FIG. 3 is a diagram illustrating axial angles of the optical elements constituting the display device DSP shown in FIG. 1.

Here, an azimuth of the tip of the arrow indicating the first direction X (X-axis) in the X-Y plane is set as a reference azimuth, and a counterclockwise angle with respect to the reference azimuth is defined as a positive angle.

The first polarizer POL1 has a first transmission axis T1. The second polarizer POL2 has s second transmission axis T2. The third polarizer POL3 has a third absorption axis A3 and a third transmission axis T3 that are substantially orthogonal to each other. The fourth polarizer POL4 has a fourth absorption axis A4 and a fourth transmission axis T4 that are substantially orthogonal to each other.

Note that though the illustration thereof is omitted from the figure, the first absorption axis of the first polarizer POL1 is substantially orthogonal to the first transmission axis T1 and the second absorption axis of the second polarizer POL2 is substantially orthogonal to the second transmission axis T2.

The respective transmission axes of the third polarizer POL3 and the fourth polarizer POL4 which are located across the display panel PNL are orthogonal to each other. For example, the fourth absorption axis A4 is substantially parallel to the first direction X and is located at an azimuth of 0°. The fourth transmission axis T4 is located at an azimuth of 90°. The third absorption axis A3 is substantially orthogonal to the fourth absorption axis A4 and is located at an azimuth of 90°. The third transmission axis T3 is substantially orthogonal to the fourth transmission axis T4 and is located at an azimuth of 0°.

The respective transmission axes of the first polarizer POL1 and the second polarizer POL2 which are located across the first viewing angle control panel 1 are parallel to each other. The respective transmission axes of the second polarizer POL2 and the third polarizer POL3 which are located across the second viewing angle control panel 2 are parallel to each other. That is, the first transmission axis T1, the second transmission axis T2, and the third transmission axis T3 are parallel to each other and are all located at an azimuth of 0°.

The alignment treatment direction AD1 of the horizontal alignment film in the first viewing angle control panel 1 and the alignment treatment direction AD2 of the horizontal alignment film in the second viewing angle control panel 2 are parallel to each other. In the example shown in FIG. 3, the alignment treatment directions AD1 and AD2 are orthogonal to the first transmission axis T1, the second transmission axis T2 and the third transmission axis T3. In other words, the alignment treatment directions AD1 and AD2 are located at an azimuth of 90°.

Note that the alignment treatment directions AD1 and AD2 may be parallel to the first transmission axis T1, the second transmission axis T2 and the third transmission axis T3. In this case, the alignment treatment directions AD1 and AD2 are located at an azimuth of 0° (not shown).

Further, the first transmission axis T1, the second transmission axis T2 and the third transmission axis T3 may be located at an azimuth of 90°, and the alignment treatment directions AD1 and AD2 may be located at an azimuth of 0° or 90° (not shown).

Here, an azimuth of 0° is equivalent to an azimuth of 0°-180° in the X-Y plane, and an azimuth of 90° azimuth is equivalent an azimuth of 90°-270° in the X-Y plane.

In the display device DSP with such a configuration as described above, when light proceeds along the third direction Z, linearly polarized light having passed through the first polarizer POL1 has a first polarization axis along the first transmission axis T1 and linearly polarized light having passed through the second polarizer POL2 via the first viewing angle control panel 1 has a second polarization axis along the second transmission axis T2. Linearly polarized light having passed through the second viewing angle control panel 2 after passing through the second polarizer POL2 has a third polarization axis along the third transmission axis T3.

As described above, the first transmission axis T1, the second transmission axis T2 and the third transmission axis T3 are parallel to each other, and therefore the polarization axes of the linearly polarized light are maintained in the same direction during the process of transmission of the light through the electronic device 100. In the example shown in FIG. 3, the first, second and third polarization axes are parallel to each other, and they are all located at an azimuth of 0° (or an azimuth of 0°-180° or along the first direction X).

The linearly polarized light having passed through the third polarizer POL3 illuminates the display panel PNL. The linearly polarized light illuminating the display panel PNL is modulated accordingly in the liquid crystal layer LC3, and at least part thereof having passed through the fourth polarizer POL4 forms an image on the screen (the plane parallel to the x-y plane). The linearly polarized light having passed through the fourth polarizer POL4 has a polarization axis along the fourth transmission axis T4. In other words, the polarization axis of the linearly polarized light having passed through the fourth polarizer POL4 is located at an azimuth of 90° (or an azimuth of 90°-270°).

When the electronic device 100 and the display panel PNL are superimposed, and the horizontal direction in the screen is defined as the first direction X, the vertical direction in the screen is defined as the second direction Y and the normal direction of the screen is defined as the third direction Z, the alignment treatment directions AD1 and AD2 are set to be parallel to the second direction Y. In the X-Y plane shown in the figure, the azimuth of 0°-180° is equivalent to the horizontal direction in the screen (or the left and right directions in the screen), and the azimuth of 90°-270° corresponds to the vertical direction in the screen (or the vertical direction in the screen).

Since the absorption axis of ordinary polarizing sunglasses is parallel to the fourth absorption axis A4 of the fourth polarizer POL4, even when the display device DSP is observed through polarizing sunglasses, the image displayed on the screen can be visually recognized.

Next, the first viewing angle control panel 1 and the second viewing angle control panel 2 will be described.

Figure 4:
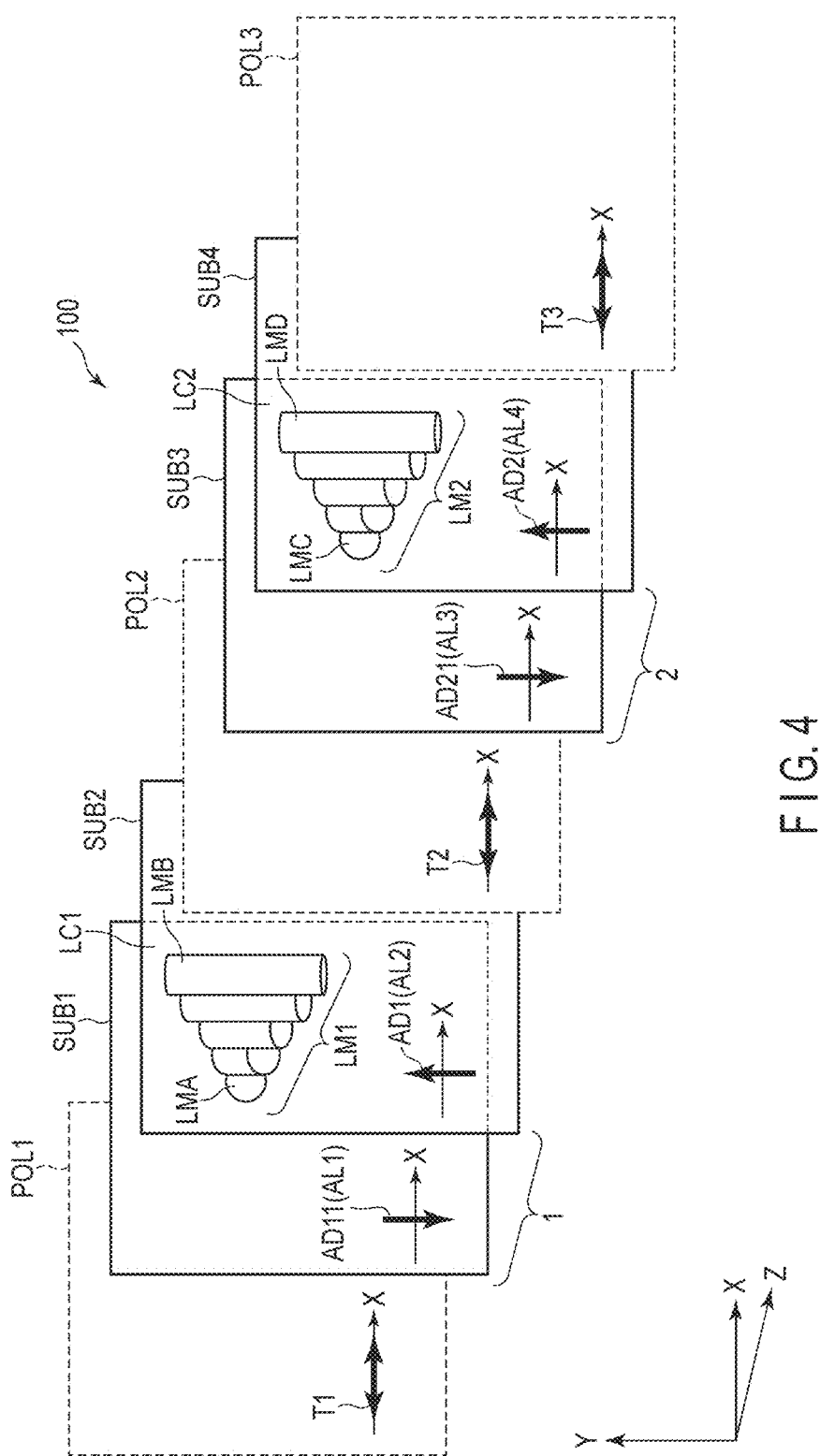
FIG. 4 is a diagram for illustrating a configuration example of a first viewing angle control panel 1 and a second viewing angle control panel 2.

FIG. 4 is a diagram illustrating a configuration example of each of the first viewing angle control panel 1 and the second viewing angle control panel 2.

Here, the initial alignment state of the liquid crystal molecules LM1 when voltage is not being applied to the first liquid crystal layer LC1, and the initial alignment state of the liquid crystal molecules LM2 when voltage is not being applied to the second liquid crystal layer LC2 are shown. In the example illustrated here, the following case will be described, where the first alignment film AL1 and the third alignment film AL3 are vertical alignment films, whereas the second alignment film AL2 and the fourth alignment film AL4 are horizontal alignment films. But the first alignment film AL1 and the third alignment film AL3 may as well be horizontal alignment films and the second alignment film AL2 and the fourth alignment film AL4 may as well be vertical alignment films.

The second alignment film AL2 and the fourth alignment films AL2 and AL4, which are horizontal alignment films, require the alignment treatment, while the first alignment film AL1 and the third alignment film AL3, which are vertical alignment films, do not require alignment treatment. But, from the viewpoint of obtaining a stable alignment state, it is preferable to perform the alignment treatment for the first alignment film AL1 and the third alignment film AL3. In this case, an alignment treatment direction AD11 of the first alignment film AL1 and an alignment treatment direction AD21 of the third alignment film AL3 are substantially parallel to and opposite to an alignment treatment direction AD1 of the second alignment film AL2 and an alignment treatment direction AD2 of the fourth alignment film AL4. Note that the alignment treatment may be a rubbing treatment or a photo-alignment treatment.

In the configuration example shown in FIG. 4, the alignment treatment direction AD1 and the alignment treatment direction AD2 are located at an azimuth of 90°, and the alignment treatment direction AD11 and the alignment treatment direction AD21 are located at an azimuth of 270°.

In the first liquid crystal layer LC1, a plurality of liquid crystal molecules LM1 aligned between the first alignment film AL1 and the second alignment film AL2 along the third direction Z are hybrid-aligned. Note that FIG. 4 schematically shows the liquid crystal molecules LM1 in plan view. Liquid crystal molecules LMA located on a side proximate to the first substrate SUB1 are vertically aligned so that their longitudinal axes are along the normal direction of the substrate (the third direction).

Liquid crystal molecules (the first liquid crystal molecules) LMB located on a side proximate to the second substrate SUB2 are horizontally aligned along the X-Y plane and initially aligned so that their longitudinal axes are along the alignment treatment direction AD1. Or, the first initial alignment direction of the liquid crystal molecules LMB is parallel to the alignment treatment direction AD1 and orthogonal to the first transmission axis T1. In other words, the liquid crystal molecules LMB are initially aligned in an azimuth of 90°-270° (or the vertical direction in the screen). Moreover, the liquid crystal molecules LMB are inclined so that end portions of the tip side of the arrow indicating the alignment treatment direction AD1 are spaced apart from the second substrate SUB2 (or so that end portions thereof on a rear end side of the arrow indicating the alignment treatment direction AD1 become proximate to the second substrate SUB2).

The arrow indicating the alignment treatment direction AD1 and the arrow indicating the alignment treatment direction AD11 may be opposite to each other. Further, when the first alignment film AL1 is a horizontal alignment film and the second alignment film AL2 is a vertical alignment film, the liquid crystal molecules LMA are horizontally aligned in an azimuth of 90°-270° and the liquid crystal molecules LMB are vertically aligned.

In the second liquid crystal layer LC2, a plurality of liquid crystal molecules LM2 aligned between the third alignment film AL3 and the fourth alignment film AL4 along the third direction Z are hybrid-aligned. FIG. 4 schematically shows the liquid crystal molecules LM2 in plan view. Liquid crystal molecules LMC located on a side proximate to the third substrate SUB3 are vertically aligned so that their longitudinal axes are along the normal direction of the substrate (the third direction).

Liquid crystal molecules (the second liquid crystal molecules) LMD located on a side proximate to the fourth substrate SUB4 are horizontally aligned along the X-Y plane, and initially aligned so that their longitudinal axis are along the alignment treatment direction AD2. Or, the second initial alignment direction of the liquid crystal molecules LMD is parallel to the alignment treatment direction AD2 and orthogonal to the first transmission axis T1. In other words, the liquid crystal molecules LMD are initially aligned in an azimuth of 90°-270° (or the vertical direction in the screen). Moreover, the liquid crystal molecules LMD are inclined so that the end portions thereof on the tip end side of the arrow indicating the alignment treatment direction AD2 is spaced apart from the fourth substrate SUB4 (or such that the end portions thereof on the rear end side of the arrow indicating the alignment treatment direction AD2 are inclined to be proximate to the fourth substrate SUB4).

Note that the arrow indicating the alignment treatment direction AD2 and the arrow indicating the alignment treatment direction AD21 may be opposite to each other. When the third alignment film AL3 is a horizontal alignment film and the fourth alignment film AL4 is a vertical alignment film, the liquid crystal molecules LMC are horizontally aligned in an azimuth of 90°-270° and the liquid crystal molecules LMD are vertically aligned.

Thus, the first initial alignment direction of the liquid crystal molecules LMB, which are those horizontally aligned among the liquid crystal molecules in the first liquid crystal layer LC1, and the second initial alignment direction of the liquid crystal molecules LMD, which are those horizontally aligned among the liquid crystal molecules in the second liquid crystal layer LC2, are parallel to each other, and further orthogonal to the first transmission axis T1, the second transmission axis T2 and the third transmission axis T3.

Note that the alignment treatment directions AD1 and AD2 may be located in an azimuth of 0°, and in this case, the first initial alignment direction of the liquid crystal molecules LMB and the second initial alignment direction of the liquid crystal molecules LMD are parallel to each other and parallel to the first transmission axis T1, the second transmission axis T2 and the third transmission axis T3.

Figure 5:
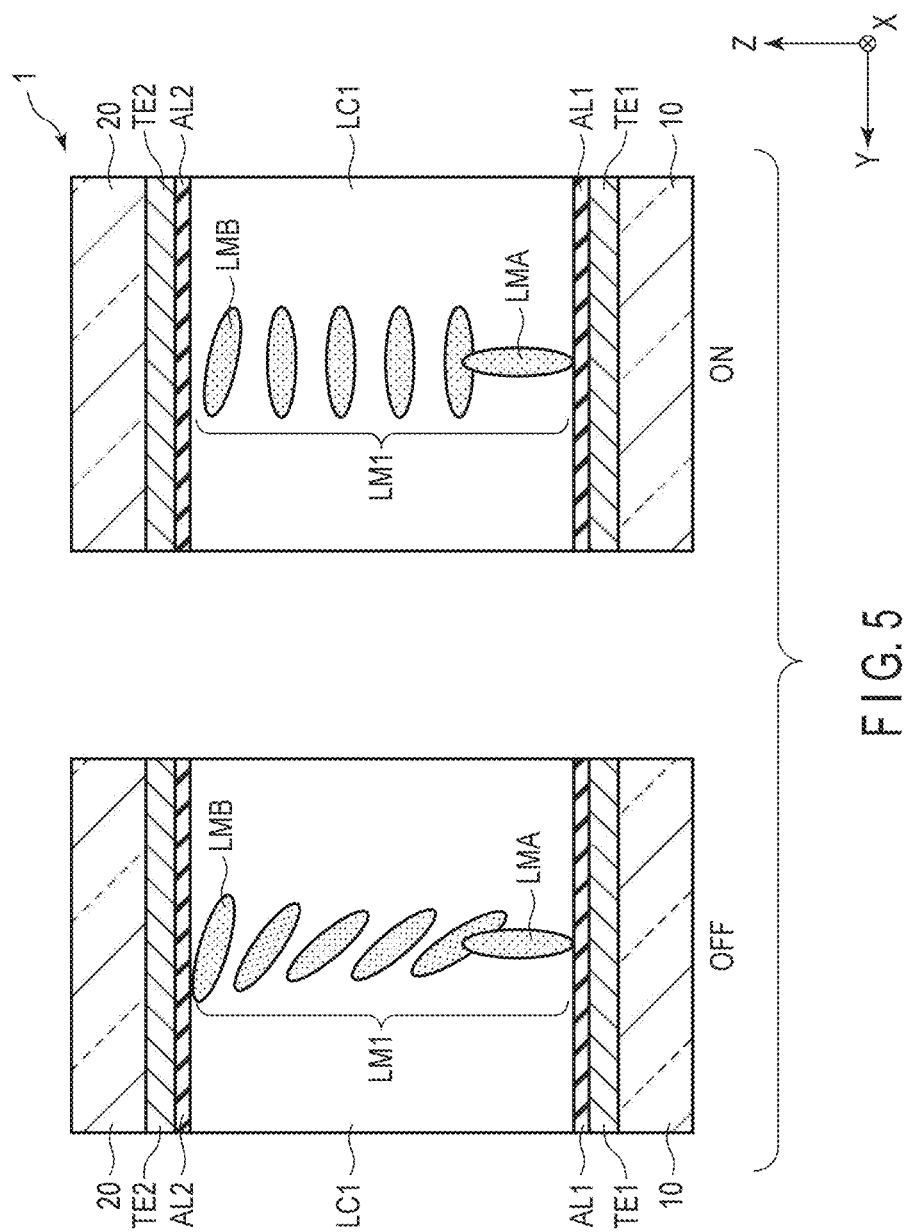
FIG. 5 is a diagram illustrating operation of the first viewing angle control panel 1.

FIG. 5 is a diagram illustrating the operation of the first viewing angle control panel 1.

The cross-sectional view shown on the left side of the figure illustrates an off state (OFF), where no potential difference is generated between the first transparent electrode TE1 and the second transparent electrode TE2. On the other hand, the cross-sectional view shown on the right side of the figure illustrates an on state (ON), where a potential difference is generated between the first transparent electrode TE1 and the second transparent electrode TE2.

The first liquid crystal layer LC1 is formed of a liquid crystal material having negative dielectric anisotropy (a negative type liquid crystal material). The second liquid crystal layer LC2 of the second viewing angle control panel 2 is also formed of a negative type liquid crystal material. A plurality of liquid crystal molecules LM1 aligned along the third direction Z includes liquid crystal molecules LMA and LMB. In the off state, the liquid crystal molecules LMA in the vicinity of the first alignment film AL1 exhibit substantially vertical alignment, and liquid crystal molecules LMB in the vicinity of the second alignment film AL2 exhibit substantially a horizontal alignment. Further, other liquid crystal molecules LM1 located between the liquid crystal molecules LMA and the liquid crystal molecules LMB continuously change their tilt angles, respectively. Thus, these liquid crystal molecules LM1 are initially aligned to exhibit hybrid alignment.

In the on state, as for the negative type liquid crystal material, the longitudinal axes of the liquid crystal molecule LM1 are aligned so as to intersect the electric field. In other words, the liquid crystal molecules LM1 are horizontally aligned.

Here, as the first viewing angle control panel 1, an example case has been described, in which the first liquid crystal layer LC1 is formed of a negative type liquid crystal material. But note that the first liquid crystal layer LC1 may be formed of a positive type liquid crystal material having positive dielectric anisotropy. Further, the first viewing angle control panel 1 may also be a liquid crystal panel to which the electric field control birefringence mode is applied. In this case as well, the alignment treatment direction AD11 of the first alignment film AL1 and the alignment treatment direction AD1 of the second alignment film AL2 are parallel and opposite to each other, and are set to located at an azimuth of 90°-270°.

With reference to FIG. 5, the operation of the first viewing angle control panel 1 is described. Since the operation of the second viewing angle control panel 2 is substantially the same as that of the first viewing angle control panel 1, and therefore the explanation thereof is omitted.

Next, the display panel PNL is explained.

Figure 6:
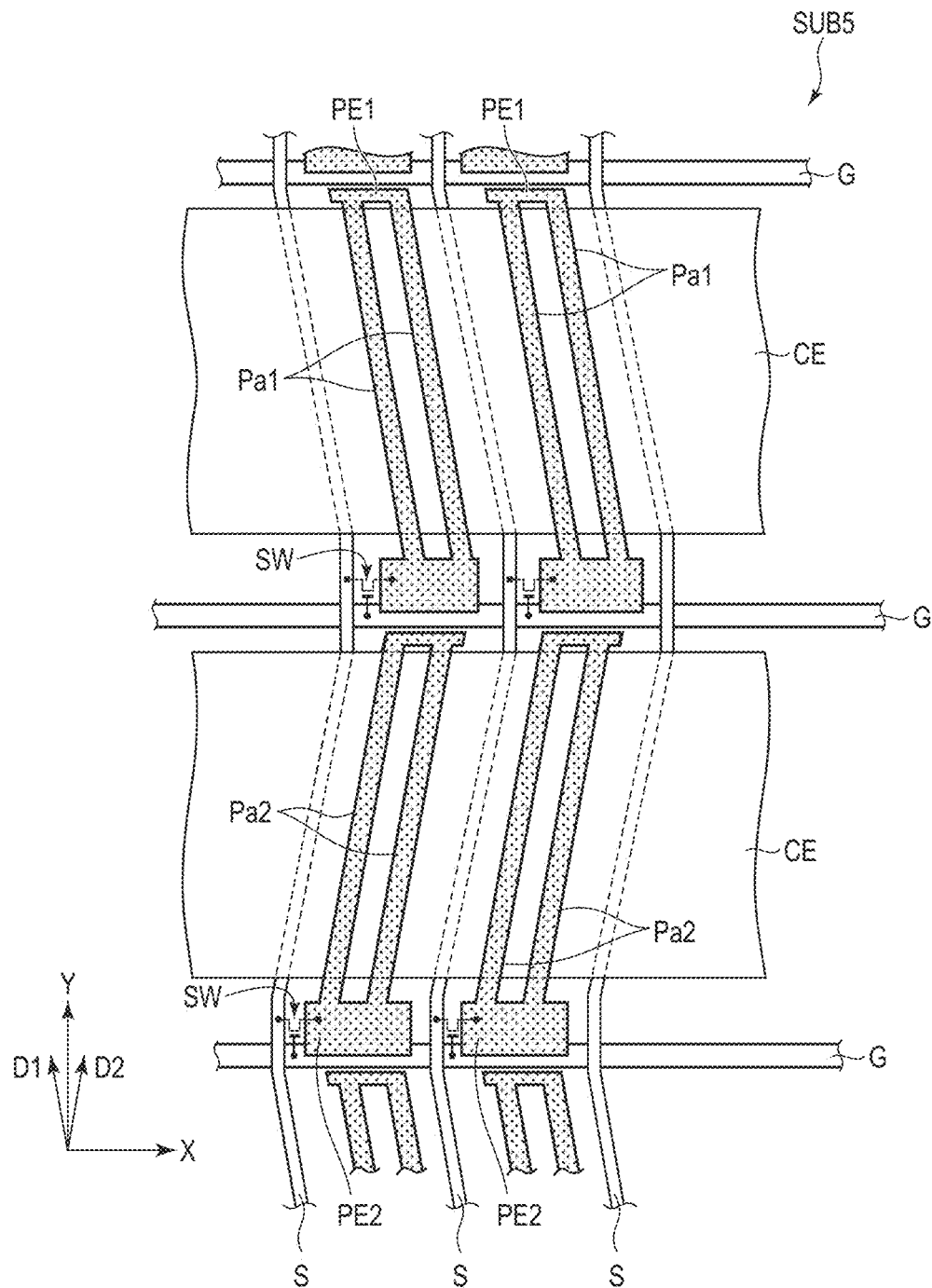
FIG. 6 is a plan view of a configuration example of a pixel layout in a display panel PNL.

FIG. 6 is a plan view showing an example of the pixel layout in the display panel PNL.

Here, only the configuration necessary for the explanation is illustrated. The fifth substrate SUB5 comprises a plurality of scanning lines G, a plurality of signal lines S, a plurality of switching elements SW, a plurality of pixel electrodes PE1 and PE2 and a common electrode CE.

The scanning lines G each extend linearly along the first direction X and are arranged to be spaced apart from each other along the second direction Y. The signal lines S each extend substantially along the second direction Y and are arranged to be spaced apart from each other along the first direction X. The switching elements SW are each electrically connected to the respective one of the scanning lines G and the respective one of the signal lines S. Each of the pixel electrodes PE1 and PE2 is electrically connected to the respective one of the switching elements SW.

The pixel electrodes PE1 are aligned along the first direction X. The pixel electrodes PE1 each include strip electrodes Pa1 overlapping the common electrode CE. The strip electrode Pa1 extends along a direction D1 which is different from the first direction X or the second direction Y.

The pixel electrodes PE2 are aligned along the first direction X. The pixel electrodes PE2 each include strip electrodes Pa2 overlapping the common electrode CE. The strip electrode Pa2 extends along a direction D2 different from the direction D1. Note that the number of strip electrodes Pa1 or Pa2 may be one, three, or more.

Figure 7:
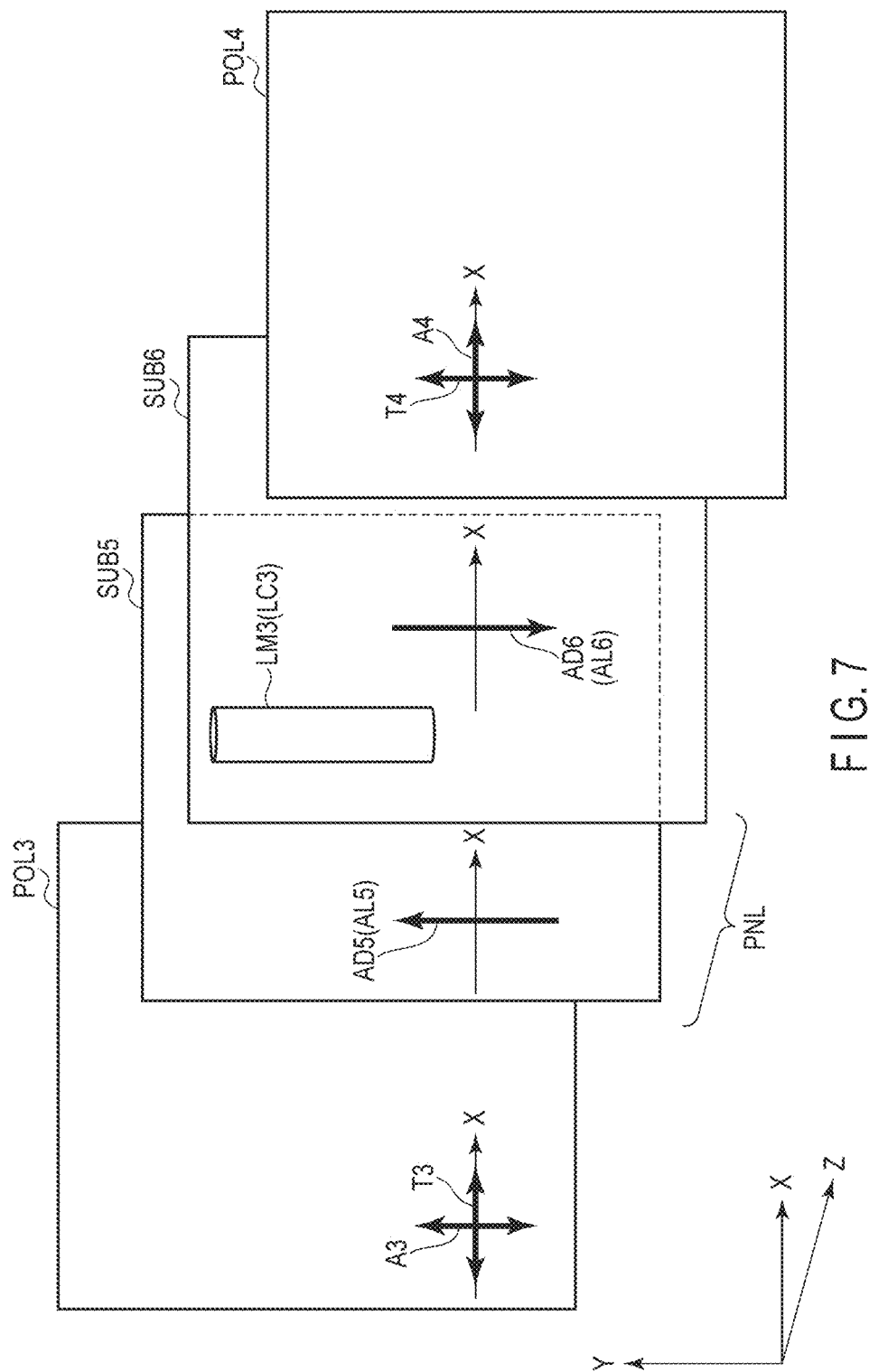
FIG. 7 is a diagram illustrating a configuration example of the display panel PNL.

FIG. 7 is a diagram illustrating a configuration example of the display panel PNL.

Here, the initial alignment state of the liquid crystal molecules LM, which is in the off state, is shown when the voltage is not applied to the liquid crystal layer LC3 between the alignment films AL5 and the alignment film AL6.

The alignment treatment direction AD5 of the alignment film AL5 and the alignment treatment direction AD6 of the alignment film AL6 are substantially parallel and opposite to each other. The alignment treatment direction AD5 and the alignment treatment direction AD6 are substantially parallel, for example, to the fourth transmission axis T4. In other words, in the X-Y plane, the tip of the arrow indicating the alignment treatment direction AD5 is located at an azimuth of 90°, and the tip of the arrow indicating the alignment treatment direction AD6 is located at an azimuth of 270°. In the liquid crystal layer LC3, a plurality of liquid crystal molecules LM3 aligned along the third direction Z are homogeneously aligned. The liquid crystal molecules LM3 are aligned such that their longitudinal axes are along the second direction Y.

Note that the alignment treatment direction AD5 and the alignment treatment direction AD6 may be substantially orthogonal to the fourth transmission axis T4. Further, the third transmission axis T3 may be located at an azimuth of 90° and the fourth transmission axis T4 may be located at an azimuth of 0°. But as described above, from the viewpoint of viewing the displayed images through polarized sunglasses, it is preferable that the fourth transmission axis T4 be located at an azimuth of 90° and the third transmission axis T3 be located at an azimuth of 0° as illustrated in the figure.

Next, the viewing angle characteristics of the electronic device 100 of the first configuration example will be described.

Figure 8A:
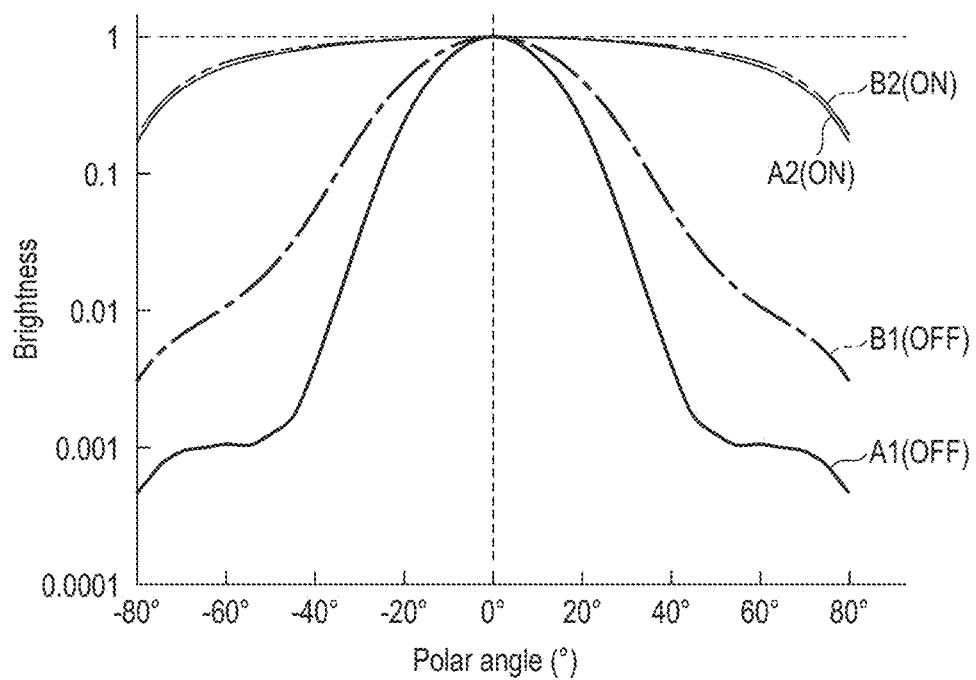

FIG. 8A is a diagram illustrating the viewing angle characteristics of the electronic device 100 when it is off and on.

The horizontal axis of the figure indicates the polar angle (°), which is the angle made between the normal direction of the electronic device 100 and a line along the main direction of the observation (measurement), and here, it indicates the polar angle along the first direction X in the X-Y plane, that is, an azimuth of 0°-180°. Here, the azimuth of 0° in the X-Y plane (the tip of the arrow pointing in the first direction X) is a positive angle, and the azimuth of 180° in the X-Y plane (the rear end of the arrow pointing in the first direction X) is a negative angle. The vertical axis of the figure indicates brightness (relative value).

The conditions of the simulation to be described here are as follows. Illumination light from the illumination device IL is unpolarized light, and the first viewing angle control panel 1 is held between the first polarizer POL1 and the second polarizer POL2, and the second viewing angle control panel 2 is held between the second polarizer POL2 and the third polarizer POL3. No other optical elements are provided, and the drive voltage of the first liquid crystal layer LC1 and the second liquid crystal layer LC2 when they are on is 30V, and the wavelength of transmitted light is 550 nm.

The refractive anisotropy Δn of each of the first liquid crystal layer LC1 and the second liquid crystal layer LC2 is set to 0.15 and the thickness d of each of the first liquid crystal layer LC1 and the second liquid crystal layer LC2 is set to 30 μm. The first liquid crystal layer LC1 and the second liquid crystal layer LC2 are each formed of a negative type liquid crystal material.

The brightness of the light having passed through the third polarizer POL3 was calculated by simulation for each of the on and off states.

The simulation results of the electronic device 100 of this embodiment are indicated by curves A1 and A2 in the figure. The simulation result indicated by the curve A1 in the figure corresponds to the viewing angle characteristics in the off state, and the simulation result indicated by the curve A2 in the figure corresponds to the viewing angle characteristics in the on state.

Both the viewing angle characteristic A1 in the off state and the viewing angle characteristic A2 in the on state exhibit the maximum brightness when observed from the normal direction (when the polar angle is 0°). Further, in both the viewing angle characteristics A1 and A2, even when the observation position is tilted to an azimuth of 0° with respect to the normal direction (that is, in the case of a positive polar angle) or when the observation position is tilted to an azimuth of 180° with respect to the normal direction (that is, in the case of a negative polar angle), it exhibits such a tendency that the brightness decreases as the polar angle increases, and the brightness distribution is substantially symmetrical.

The range of high brightness in the case of the off state is smaller than the range of high brightness in the case of the on state. For example, focusing on the viewing angle characteristic A2 in the on state, it is observed that even if the polar angle is 80°, a brightness of 15% or more as compared to the brightness in the normal direction can be obtained. On the other hand, focusing on the viewing angle characteristic A1 in the off state, it is observed that when the polar angle exceeds 40°, only less than 1% of the brightness in the normal direction can be obtained.

FIG. 8A also shows the simulation results of a comparative example.

The conditions for the simulation of the comparative example are as follows: the first viewing angle control panel 1 is held between the first polarizer POL1 and the second polarizer POL2, and the second viewing angle control panel 2 and the third polarizer POL3 shall not be provided. The other conditions are the same as above.

The simulation results of the electronic device in the comparative example are indicated by curves B1 and B2 in the figure. The simulation result indicated by the curve B1 in the figure corresponds to the viewing angle characteristics in the off state, and the simulation result indicated by the curve B2 in the figure corresponds to the viewing angle characteristics in the on state. The viewing angle characteristic B2 in the on state are equivalent to the viewing angle characteristic A2 of the electronic device 100 of this embodiment in the on state.

The viewing angle characteristic B1 in the off state exhibit a broader tendency compared to the viewing angle characteristic A1. In other words, focusing on the viewing angle characteristic B1, it is observed that when the polar angle is 40°, about 5% of the brightness in the normal direction is obtained, and when the polar angle is 60°, about 1% of the brightness in the normal direction is obtained.

From the above-discussed simulation results, it has been confirmed that according to the electronic device 100 of this embodiment, by controlling the on/off states of the first viewing angle control panel 1 and the second viewing angle control panel 2, a high viewing angle controllability can be achieved.

Figure 8B:
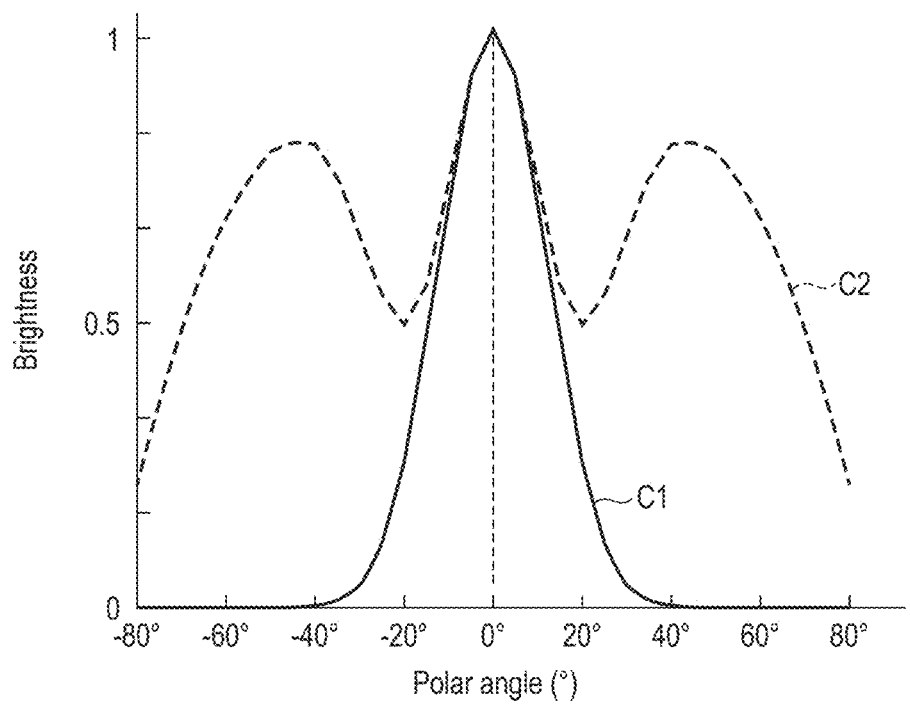
FIG. 8B is a diagram for illustrating the viewing angle characteristics when the device is off between with and without a second polarizer POL2 being present.

For reference, the viewing angle characteristics in the off state when with and without the second polarizer POL2 were compared with each other. FIG. 8B shows the simulation results of the viewing angle characteristics in the off state. A curve C1 in the figure indicates the simulation results when the second polarizer POL2 is present (corresponding to the first configuration example), and a curve C2 in the figure shows the simulation results when the second polarizer POL2 is not present.

The horizontal axis in the figure indicates the polar angle (°), and the vertical axis in the figure shows the brightness (relative value).

It has been confirmed that the viewing angle characteristic C2 exhibits a broader tendency compared to the viewing angle characteristic C1. In other words, focusing on the viewing angle characteristic C2, such a tendency is observed that as the polar angle increases from 0° to 20°, the brightness gradually decreases, but as the polar angle further increases from 20° to 50°, the brightness increases again.

From these simulation results, the following has been confirmed. That is, in the first configuration example, it is extremely important to place the second polarizer POL2 between the first viewing angle control panel 1 and the second viewing angle control panel 2. Further, by setting the second transmission axis T2 of the second polarizer POL2 parallel to the first transmission axis T1 and the third transmission axis T3, even a higher viewing angle controllability can be achieved.

Figure 9:
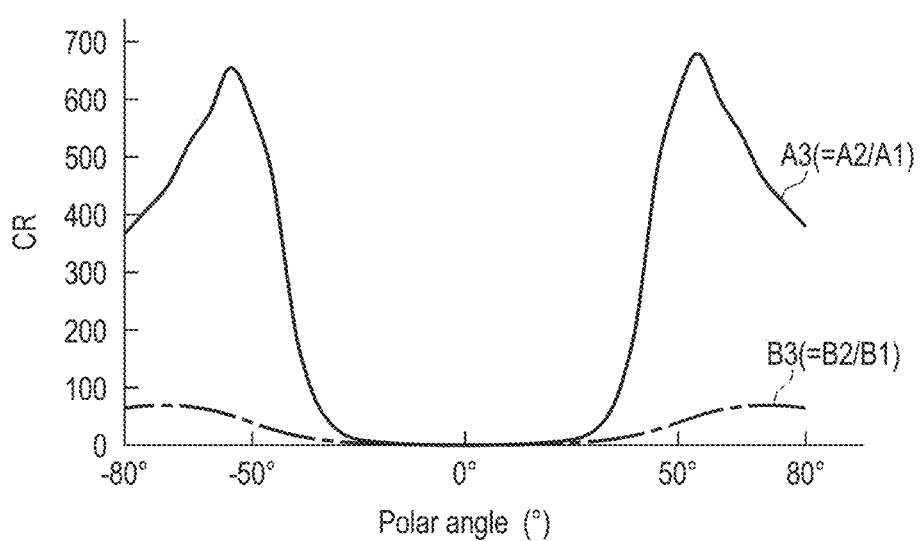
FIG. 9 is a diagram showing calculation results of contrast ratio (CR) based on simulation results shown in FIG. 8A.

FIG. 9 shows the calculation results of contrast ratio (CR) based on the simulation results shown in FIG. 8A.

The horizontal axis of the figure indicates the polar angle (°), and the vertical axis of the figure indicates the contrast ratio. The contrast ratio was calculated based on <the brightness in the on state/the brightness in the off state>.

According to the electronic device 100 of this embodiment, as indicated by the curve A3 in the figure, when the polar angle is 40°, a contrast ratio of 1:100 is obtained, and when the polar angle was 50°, a contrast ratio of 1:600 is obtained. According to the electronic device of the comparative example, a contrast ratio of 1:100 could not be achieved even when the polar angle was 80°.

Second Configuration Example

Next, another electronic devices 100 applicable to the display device DSP shown in FIG. 1 will be described.

Figure 10:
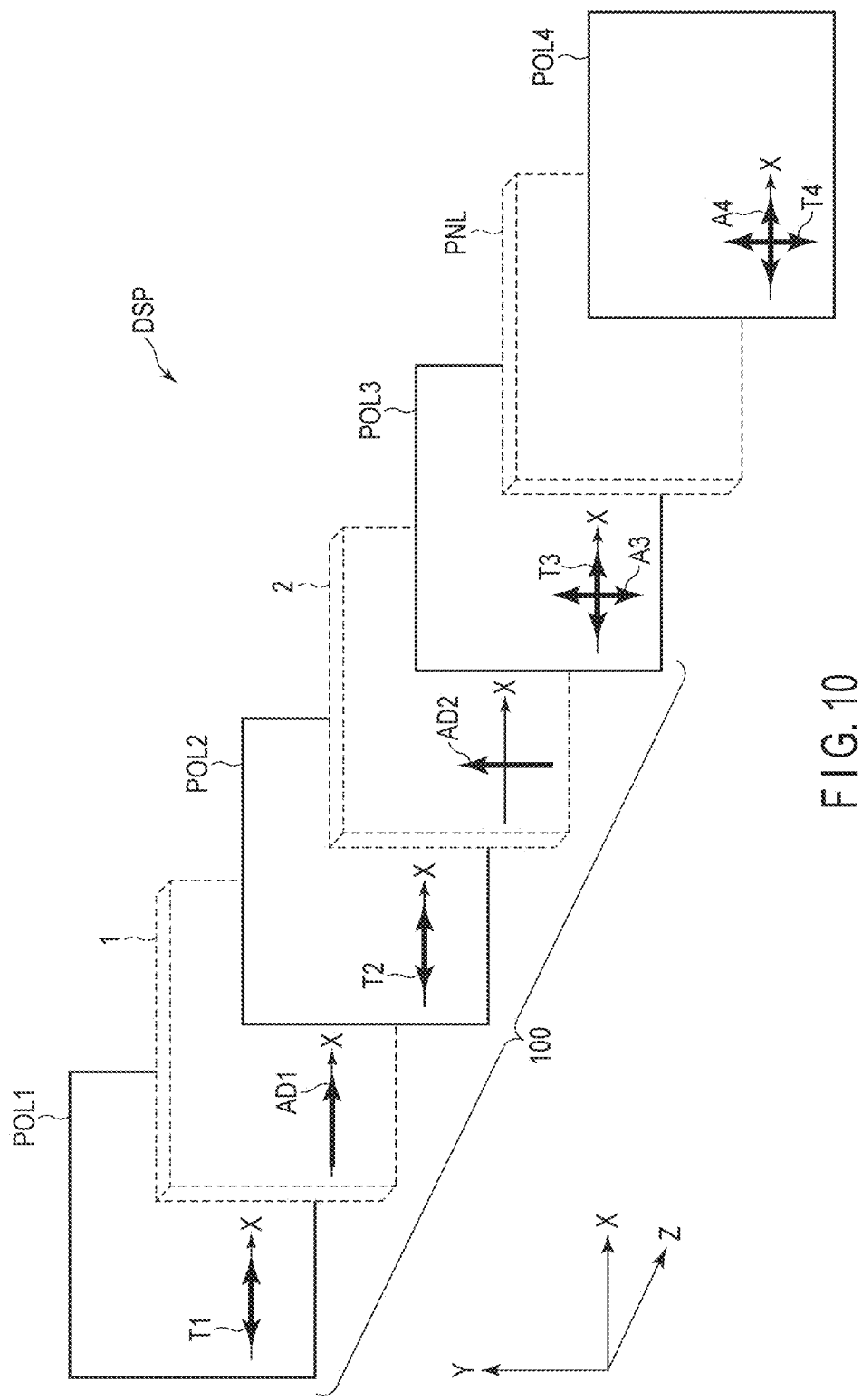
FIG. 10 is a diagram illustrating the axial angle of each optical element constituting the display device DSP shown in FIG. 1.

FIG. 10 is a diagram illustrating the axial angles of the optical elements which constitute the display device DSP shown in FIG. 1.

The second configuration example shown in FIG. 10 is different from the first configuration example shown in FIG. 3 in that the alignment treatment direction AD1 of the first viewing angle control panel 1 and the alignment treatment direction AD2 of the second viewing angle control panel 2 are orthogonal to each other. The rest of the configuration is identical to that of the first configuration example, and detailed explanations thereof are omitted.

The second polarizer POL2 is provided between the first viewing angle control panel 1 and the second viewing angle control panel 2. The first viewing angle control panel 1 is provided between the first polarizer POL1 and the second polarizer POL2. The second viewing angle control panel 2 is provided between the second polarizer POL2 and the third polarizer POL3. The first transmission axis T1, the second transmission axis T2 and the third transmission axis T3 are parallel to each other and located at an azimuth of 0°. The fourth transmission axis T4 is orthogonal to the third transmission axis T3 and is located at an azimuth of 90°.

One of the alignment treatment direction AD1 and the alignment treatment direction AD2 is orthogonal to the first transmission axis T1 and the other is parallel to the first transmission axis T1. In the example shown in FIG. 10, the alignment treatment direction AD1 is parallel to the first transmission axis T1, the second transmission axis T2 and the third transmission axis T3, and the alignment treatment direction AD2 is orthogonal to the first transmission axis T1, the second transmission axis T2 and the third transmission axis T3. In other words, the alignment treatment direction AD1 is located at an azimuth of 0° and the alignment treatment direction AD2 is located at an azimuth of 90°.

Note that the alignment treatment direction AD1 may be located at an azimuth of 90° and the alignment treatment direction AD2 may be located at an azimuth of 0°. Further, the first transmission axis T1, the second transmission axis T2 and the third transmission axis T3 may be located at an azimuth of 90°.

When the electronic device 100 and the display panel PNL are superimposed on each other, and the horizontal direction in the screen is defined as the first direction X, the vertical direction in the screen is defined as the second direction Y and the normal direction of the screen is defined as the third direction Z, one of the alignment treatment directions AD1 and AD2 is set to be parallel to the first direction X, and the other is set to be parallel to the second direction Y. As described above, in the X-Y plane shown in the figure, the azimuth of 90°-270° corresponds to the vertical direction in the screen (or up-and-down directions in the screen).

Next, the first viewing angle control panel 1 and the second viewing angle control panel 2 will be described.

Figure 11:
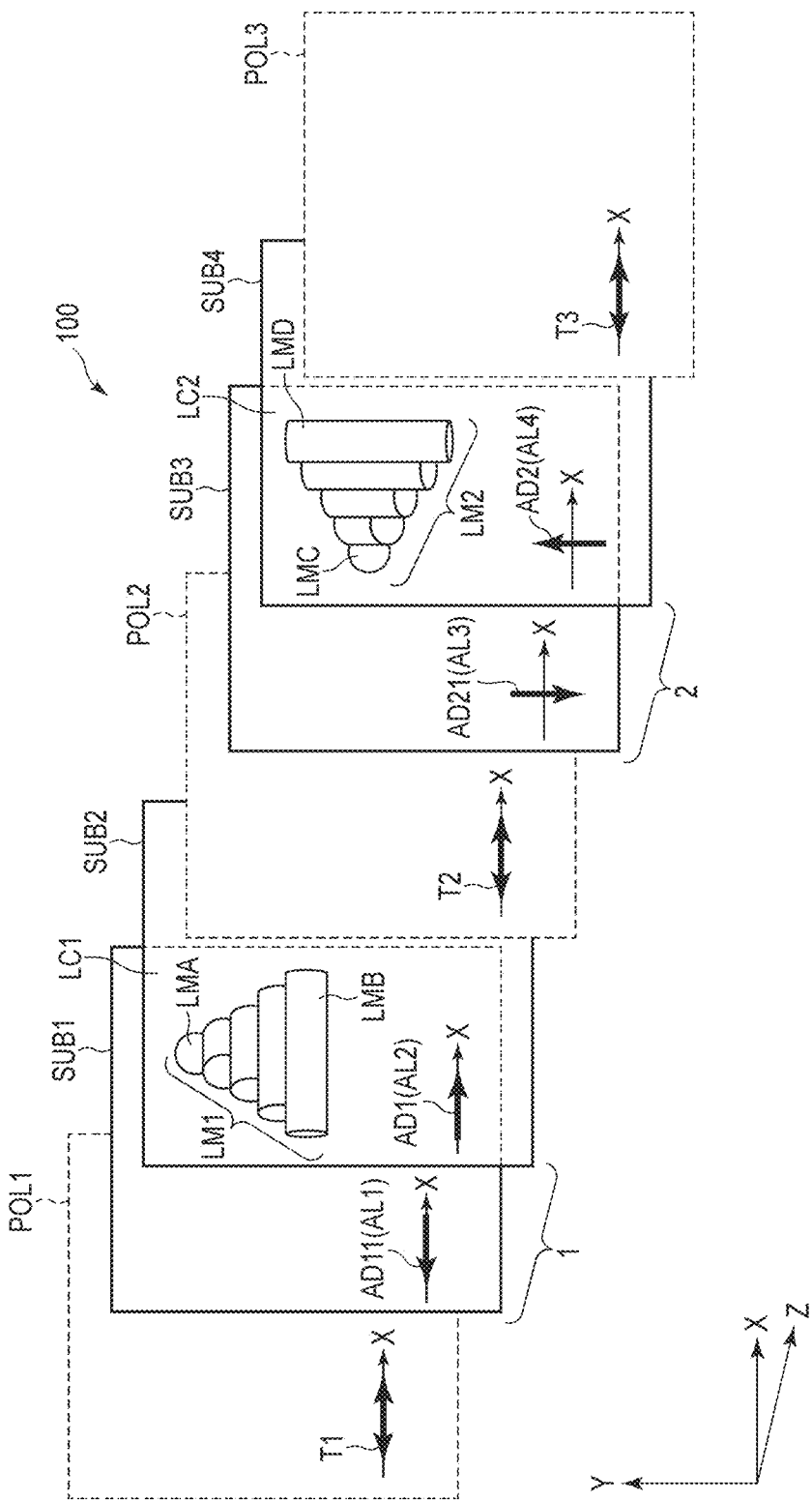
FIG. 11 a diagram illustrating an example configuration of the first viewing angle control panel 1 and the second viewing angle control panel 2.

FIG. 11 is a diagram illustrating a configuration example of the first viewing angle control panel 1 and the second viewing angle control panel 2.

Here, the initial alignment state of the liquid crystal molecules LM1 in the off state when voltage is not being applied to the first liquid crystal layer LC1, and the initial alignment state of the liquid crystal molecules LM2 in the off state when voltage is not being applied to the second liquid crystal layer LC2 are shown. Note that the example presented here is directed to the case where the first alignment film AL1 and the third alignment film AL3 are vertical alignment films, and the second alignment film AL2 and the fourth alignment film AL4 are horizontal alignment films. It is only natural that the first alignment film AL1 and the third alignment film AL3 may be horizontal alignment films, whereas the second alignment film AL2 and the fourth alignment film AL4 may be vertical alignment films.

The second alignment film AL2 and the fourth alignment film AL4, which are horizontal alignment films, require an alignment treatment. In the configuration example shown in FIG. 11, the alignment treatment direction AD1 of the second alignment film AL2 is located at an azimuth of 0°, and the alignment treatment direction AD2 of the fourth alignment film AL4 is located at an azimuth of 90°.

The first alignment film AL1 and the third alignment film AL3, which are vertical alignment films, do not require an alignment treatment. But, from the viewpoint of obtaining a stable alignment state, it is preferable to perform an alignment treatment onto the first alignment film AL1 and the third alignment film AL3. In the configuration example shown in FIG. 11, the alignment treatment direction AD11 of the first alignment film AL1 is located at an azimuth of 180°, and the alignment treatment direction AD21 of the third alignment film AL3 is located at an azimuth of 270°.

In the first liquid crystal layer LC1, the liquid crystal molecules LM1 aligned along the third direction Z between the first alignment film AL1 and the second alignment film AL2 are hybrid-aligned. The liquid crystal molecules LMA located on the side proximate to the first substrate SUB1 are vertically aligned so that their longitudinal axes are along the normal direction of the substrate (the third direction).

The liquid crystal molecules (the first liquid crystal molecules) LMB located on the side proximate to the second substrate SUB2 are horizontally aligned along the X-Y plane, and initially aligned so that their longitudinal axes are along the alignment treatment direction AD1. Or, the first initial alignment direction of the liquid crystal molecules LMB is parallel to the alignment treatment direction AD1 and parallel to the first transmission axis T1. In other words, the liquid crystal molecules LMB are initially aligned in an azimuth of 0°-180° (or the horizontal direction in the screen). Moreover, the liquid crystal molecules LMB are inclined so that the end portions on the distal end side of the arrow indicating the alignment treatment direction AD1 are spaced apart from the second substrate SUB2 (or the end portions on the rear end side of the arrow indicating the alignment treatment direction AD1 are proximate to the second substrate SUB2).

The arrow indicating the alignment treatment direction AD1 and the arrow indicating the alignment treatment direction AD11 may be opposite to each other. Further, when the first alignment film AL1 is a horizontal alignment film and the second alignment film AL2 is a vertical alignment film, the liquid crystal molecules LMA are horizontally aligned in an azimuth of 0°-180° and the liquid crystal molecules LMB are vertically aligned.

In the second liquid crystal layer LC2, the liquid crystal molecules LM2 aligned along the third direction Z between the third alignment film AL3 and the fourth alignment film AL4 are hybrid-aligned. The liquid crystal molecules LMC located on the side proximate to the third substrate SUB3 are vertically aligned so that their longitudinal axes are along the normal direction of the substrate (the third direction).

The liquid crystal molecules (the second liquid crystal molecules) LMD located on the side proximate to the fourth substrate SUB4 are horizontally aligned along the X-Y plane and initially aligned so that their longitudinal axes are along the alignment treatment direction AD2. Or, the second initial alignment direction of the liquid crystal molecules LMD is parallel to the alignment treatment direction AD2 and orthogonal to the first transmission axis T1. In other words, the liquid crystal molecules LMD are initially aligned in an azimuth of 90°-270° (or the vertical direction in the screen). Moreover, the liquid crystal molecules LMD are inclined so that the end portions on the tip side of the arrow indicating the alignment treatment direction AD2 are spaced apart from the fourth substrate SUB4 (or the end portions on the rear end side of the arrow indicating the alignment treatment direction AD2 are proximate to the fourth substrate SUB4).

The arrow indicating the alignment treatment direction AD2 and the arrow indicating the alignment treatment direction AD21 may be opposite to each other. Further, when the third alignment film AL3 is a horizontal alignment film and the fourth alignment film AL4 is a vertical alignment film, the liquid crystal molecules LMC may be horizontally aligned in azimuth of 90°-270° and the liquid crystal molecules LMD may be vertically aligned.

Thus, the first initial alignment direction of those horizontally aligned liquid crystal molecules LMB of the liquid crystal molecules in the first liquid crystal layer LC1 and the second initial alignment direction of those horizontally aligned liquid crystal molecules LMD of the liquid crystal molecules in the second liquid crystal layer LC2 are orthogonal to each other, and one of the first initial alignment direction and the second initial alignment direction is orthogonal to the first transmission axis T1, the second transmission axis T2 and the third transmission axis T3.

Second Configuration Example; Modified Example

Figure 12:
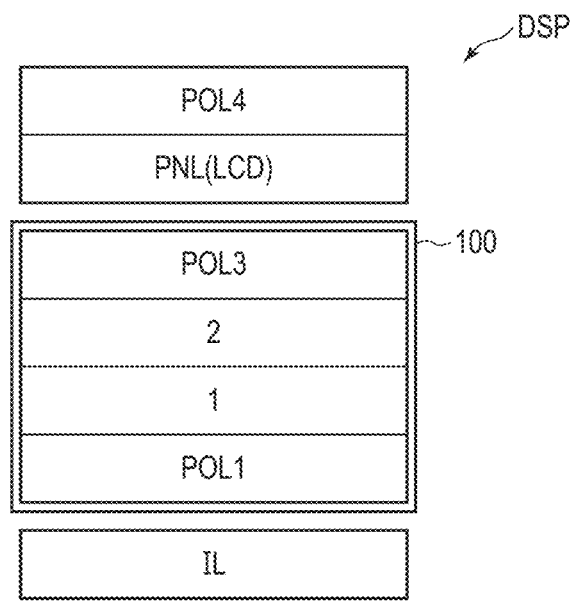
FIG. 12 a diagram illustrating a modified example of the electronic device 100.

FIG. 12 is a diagram showing a modified example of the electronic device 100.

The modified example shown in FIG. 12 is different from the configuration example shown in FIG. 1 in that the second polarizer POL2 is omitted. That is, in the electronic device 100 shown in FIG. 1, the second polarizer POL2 is provided between the first viewing angle control panel 1 and the second viewing angle control panel 2, whereas in the electronic device 100 shown in FIG. 12, the first viewing angle control panel 1 and the second viewing angle control panel 2 are in contact with each other.

The axial angles of the first viewing angle control panel 1, the second viewing angle control panel 2, the first polarizer POL1 and the second polarizer POL2 are as shown in FIGS. 10 and 11, and descriptions thereof will be omitted.

Such a modified example as shown in FIG. 12 that the second polarizer POL2 is omitted, is applicable to the second configuration example where the alignment treatment direction AD1 and the alignment treatment direction AD2 are orthogonal to each other, but not applicable to the first configuration example where the alignment treatment direction AD1 and the alignment treatment direction AD2 are parallel to each other.

Figure 13:
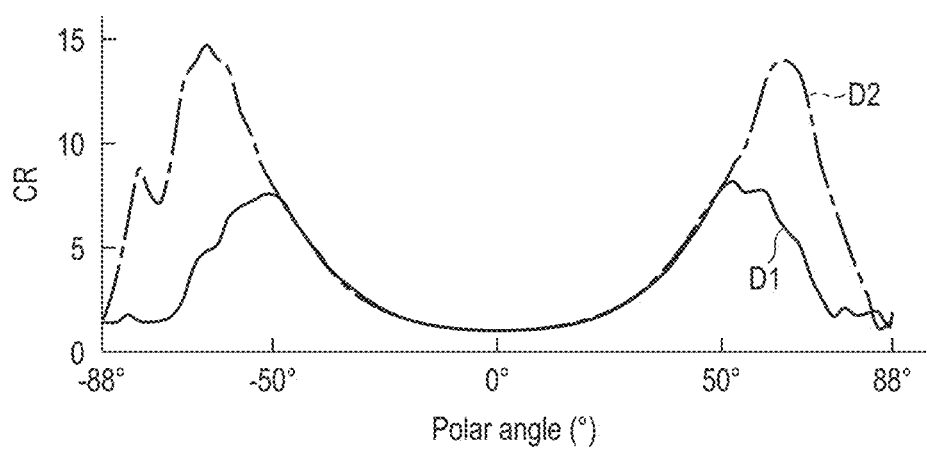
FIG. 13 a diagram illustrating viewing angle characteristics of the contrast ratio of an electronic device 100 in a second configuration example provided with the second polarizer POL2.

FIG. 13 is a diagram showing the viewing angle characteristics of the contrast ratio in an electronic device 100 of the second configuration example, which comprises the second polarizer POL2.

Figure 14:
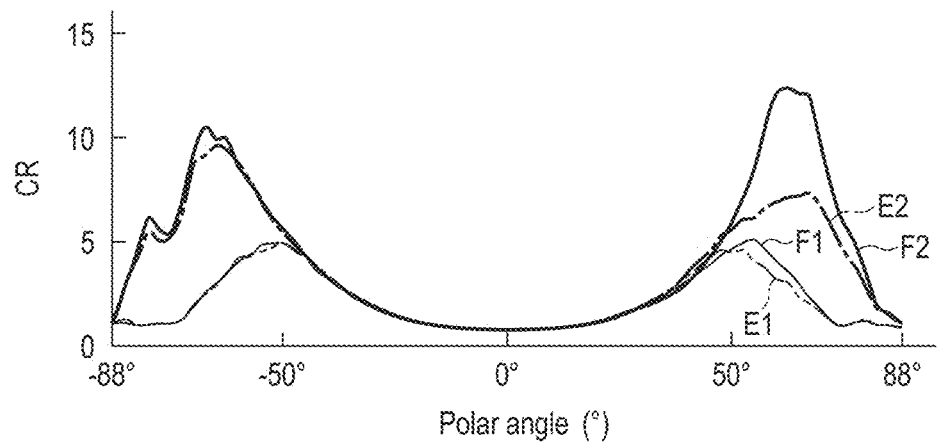
FIG. 14 a diagram illustrating viewing angle characteristics of the contrast ratio of an electronic device 100 in a modified example not provided with the second polarizer POL2.

FIG. 14 is a diagram showing the viewing angle characteristics of the contrast ratio in an electronic device 100 of the modified example, which does not comprises the second polarizer POL2.

The horizontal axis of each of the figures indicates the polar angle (°) with respect to the normal direction of the electronic device 100. The vertical axis of each of the figures indicates the contrast ratio (CR).

The conditions for calculating the contrast ratio are as follows. First, the first brightness when the first viewing angle control panel 1 and the second viewing angle control panel 2 are in the off state is measured, and then the second brightness when the first viewing angle control panel 1 and the second viewing angle control panel 2 are in the on state is measured, the ratio between the first brightness and the second brightness is calculated out as the contrast ratio.

The measurement results of the electronic device 100 of the second configuration example described with reference to FIGS. 10 and 11 are illustrated in FIG. 13 as curves D1 and D2. The measurement result indicated by the curve D1 in the figure shows the contrast ratio against the polar angle along the first direction X in the X-Y plane, that is, an azimuth of 0°-180°. The measurement results indicated by the curve D2 in the figure show the contrast ratio against the polar angle along the second direction Y in the X-Y plane, that is, an azimuth of 90°-270°.

From these measurement results, it has been confirmed that according to the electronic device 100 of this embodiment, by controlling the on/off states of the viewing angle control panel 1 and the viewing angle control panel 2, the viewing angle controllability can be realized in terms of the left and right directions in the screen and the up and down directions in the screen.

Further, the measurement results of the electronic device 100 of the modified example described with reference to FIG. 12 are shown in FIG. 14 as curves E1, E2, F1 and F2.

The measurement result indicated by the curve E1 in the figure shows the contrast ratio against the polar angle along the first direction X in the X-Y plane, that is, an azimuth of 0°-180°. The measurement result indicated by the curve E2 in the figure shows the contrast ratio against the polar angle along the second direction Y in the X-Y plane, that is, an azimuth of 90°-270°.

The measurement result indicated by the curve F1 in the figure shows the contrast ratio against the polar angle along an azimuth of 2°-182° in the X-Y plane. The measurement result indicated by the curve F2 in the figure shows the contrast ratio against the polar angle along an azimuth of 92°-272° in the X-Y plane.

From these measurement results, it has been confirmed that according to the electronic device 100 of this embodiment, by controlling the on/off states of the viewing angle control panel 1 and the viewing angle control panel 2, the viewing angle controllability can be realized in terms of the left and right directions in the screen and the up and down directions in the screen.

<Variations>

Next, other configuration examples of the display device DSP to which the electronic device 100 of this embodiment is applied will be described.

Figure 15:
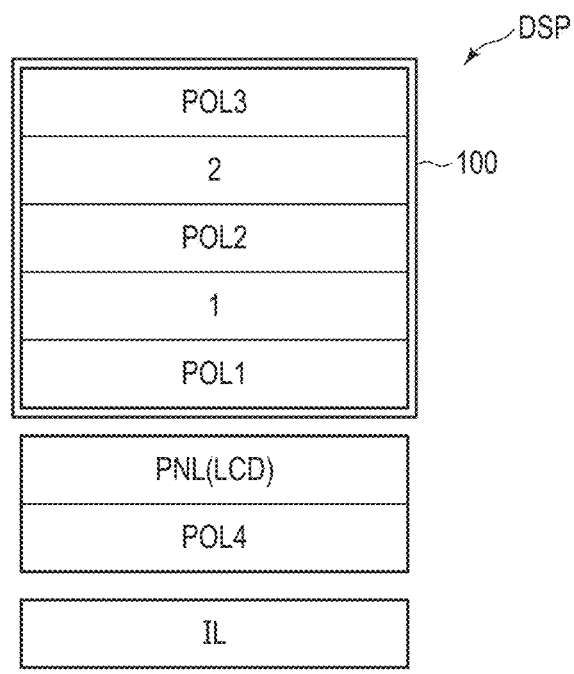
FIG. 15 is a diagram showing another configuration example of the display device DSP.

FIG. 15 is a diagram showing another configuration example of the display device DSP.

The configuration example shown in FIG. 15 is different from that of FIG. 1 in that the display panel PNL and the fourth polarizer POL4 are located between the illumination device IL and the electronic device 100. In other words, the fourth polarizer POL4 is provided on a front surface side of the illumination device IL. The display panel PNL is, for example, a liquid crystal panel and is provided on a front surface side of the fourth polarizer POL4. The first polarizer POL1 is provided on the front surface side of the display panel PNL. Other components which constitute the electronic device 100 are provided in a manner similar to that of the configuration example shown in FIG. 1.

Figure 16:
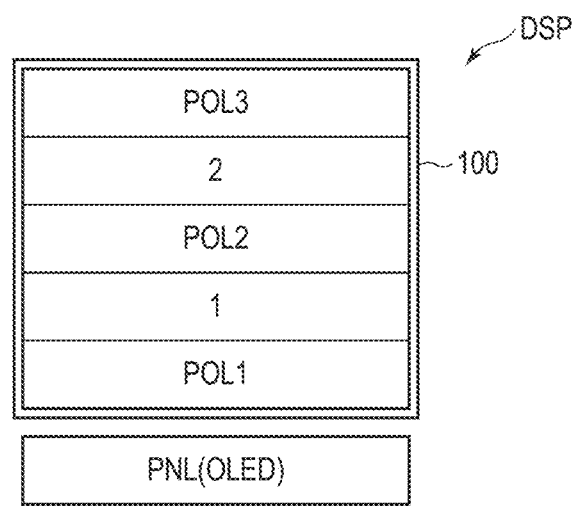
FIG. 16 is a diagram showing still another configuration example of the display device DSP.

FIG. 16 is a diagram showing still another configuration example of the display device DSP.

The configuration example shown in FIG. 16 is different from that of FIG. 15 in that the display panel PNL is of a self-luminous type and the fourth polarizer POL4 and the illumination device IL are omitted. The display panel PNL is, for example, an OLED panel comprising organic light-emitting diodes as display elements. The first polarizer POL1 is provided on the front surface side of the display panel PNL. Other components which constitute the electronic device 100 are provided in a manner similar to that of the configuration example shown in FIG. 1.

As the electronic device 100 applicable to each of the display devices DSP shown in FIGS. 15 and 16, the electronic device 100 of the first configuration example where the first initial alignment direction of the first liquid crystal molecules in the first viewing angle control panel 1 and the second initial alignment direction of the second liquid crystal molecules in the second viewing angle control panel 2 are parallel to each other may be applied, or the electronic device 100 of the second configuration example where the first initial alignment direction and the second initial alignment direction are orthogonal to each other may be applied. Further, the electronic device 100 of the modified example in which the second polarizer POL2 is omitted may as well be applied.

As described above, according to this embodiment, it is possible to provide an electronic device which can exhibit a high viewing angle controllability.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. An electronic device comprising:
a first polarizer having a first transmission axis;
a first viewing angle control panel provided on a front surface side of the first polarizer and comprising a first liquid crystal layer containing hybrid-aligned liquid crystal molecules;
a second polarizer provided on a front surface side of the first viewing angle control panel and having a second transmission axis parallel to the first transmission axis;
a second viewing angle control panel provided on a front surface side of the second polarizer and comprising a second liquid crystal layer containing hybrid-aligned liquid crystal molecules; and
a third polarizer provided on a front surface side of the second viewing angle control panel and having a third transmission axis parallel to the first transmission axis, wherein
the first viewing angle control panel comprises a first substrate comprising a first transparent electrode and a first alignment film which are formed over an entire area of a first effective area, a second substrate comprising a second transparent electrode and a second alignment film which are formed over the entire area of the first effective area, and the first liquid crystal layer held between the first substrate and the second substrate,
the liquid crystal molecules of the first liquid crystal layer include first liquid crystal molecules located on a side proximate to the first alignment film and second liquid crystal molecules located on a side proximate to the second alignment film, the second viewing angle control panel comprises a third substrate comprising a third transparent electrode and a third alignment film which are formed over an entire area of a second effective area overlapping the first effective area, a fourth substrate comprising a fourth transparent electrode and a fourth alignment film which are formed over the entire area of the second effective area, and the second liquid crystal layer held between the third substrate and the fourth substrate, the liquid crystal molecules of the second liquid crystal layer include third liquid crystal molecules located on a side proximate to the third alignment film and fourth liquid crystal molecules located on a side proximate to the fourth alignment film, the first alignment film and the third alignment film are vertical alignment films, the second alignment film and the fourth alignment film are horizontal alignment films, in plan view, a second initial alignment direction of horizontally aligned second liquid crystal molecules and a fourth initial alignment direction of horizontally aligned fourth liquid crystal molecules are parallel to each other and parallel or orthogonal to the first transmission axis, where a horizontal direction in a screen is defined as a first direction, a vertical direction in the screen is defined as a second direction and a normal direction of the screen is defined as a third direction, both the second initial alignment direction and the fourth initial alignment direction are parallel to the second direction, and both a first initial alignment direction of vertically aligned the first liquid crystal molecules and a third initial alignment direction of vertically aligned the third liquid crystal molecules are parallel to the third direction.

2. The electronic device of claim 1, wherein the first liquid crystal layer and the second liquid crystal layer are formed of a negative type liquid crystal material.

* * * * *